Oct. 20, 1925.

J. D. COMSTOCK

AUTOMOBILE TIRE TREAD

Filed Oct. 20, 1922

1,557,984

2 Sheets-Sheet 1

INVENTOR
Jackson D. Comstock
BY Bates & Macklin
ATTYS.

Oct. 20, 1925.                                                1,557,984
                    J. D. COMSTOCK
                 AUTOMOBILE TIRE TREAD
                  Filed Oct. 20, 1922           2 Sheets-Sheet 2

INVENTOR
Jackson D. Comstock
BY Bates Macklin
        ATTYS.

Patented Oct. 20, 1925.

1,557,984

UNITED STATES PATENT OFFICE.

JACKSON D. COMSTOCK, OF CHESTER, WEST VIRGINIA.

AUTOMOBILE TIRE TREAD.

Application filed October 20, 1922. Serial No. 595,721.

*To all whom it may concern:*

Be it known that I, JACKSON D. COMSTOCK, a citizen of the United States, residing at Chester, in the county of Hancock and State of West Virginia, have invented a certain new and useful Improvement in Automobile Tire Treads, of which the following is a full, clear, and exact description, reference being had to the accompanying drawings.

This invention relates to tire treads and has for its general object the construction of a tire tread which shall have maximum wear and shall have non-skid features, as well as good traction, all with the use of a minimum amount of rubber.

In the manufacture of pneumatic tires for automobiles there has been continuous improvement in the construction of the carcass of the tire until a well made carcass will outwear the usual tread. To improve the tread, the best grades of rubber obtainable are used but it has been found very difficult without greatly adding to the amount of rubber to produce a wearing life corresponding to the life of the carcass. Furthermore the projections forming the anti-skid elements on the surface wear off early in the life of the tire. By the construction of the present invention, I am enabled to make a tread with the same amount of rubber precisely as has heretofore been used on tires of a given type and size and I accomplish non-skid features as well as the obtaining of traction both for driving and grip under braking actions, and maintain these over a much larger mileage than heretofore.

Another object is to accomplish the above without adding to the difficulties or expense of the present methods of manufacturing tire casings. The preferred embodiment of my invention is illustrated in the accompanying drawings and the essential characteristics are summarized in the claims.

Figure 1:
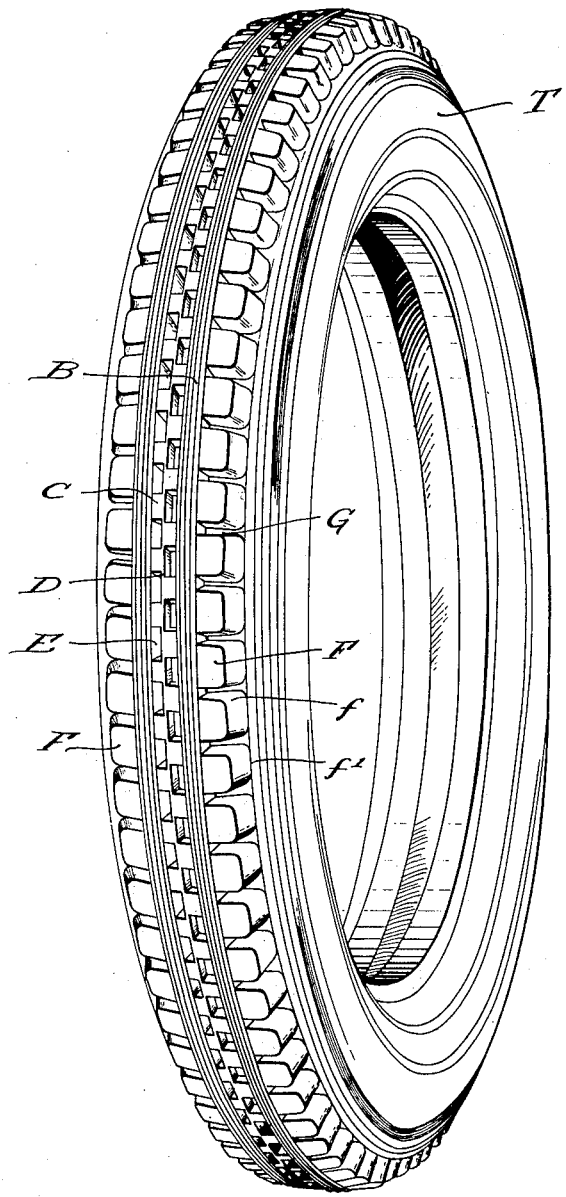
Figure 2:
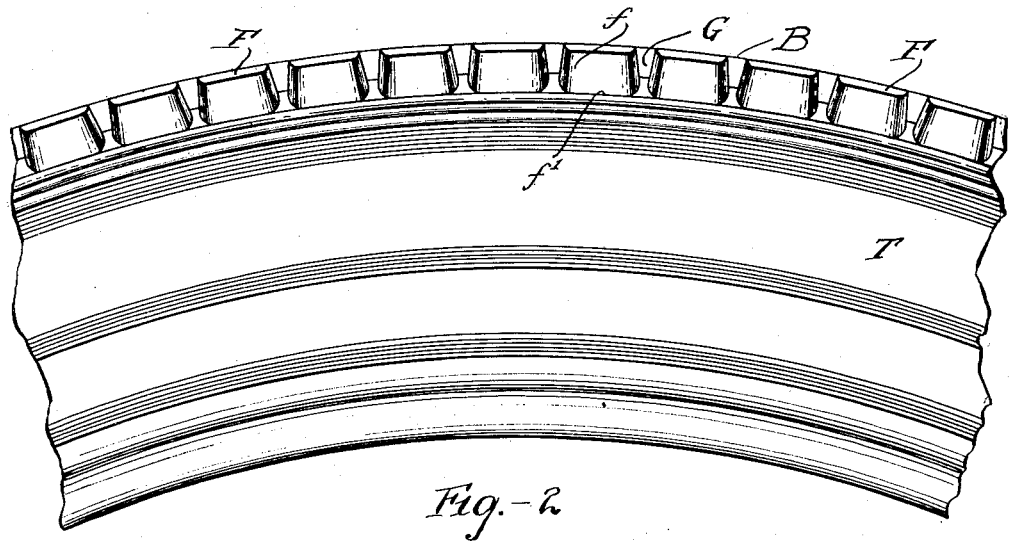
Figure 3:
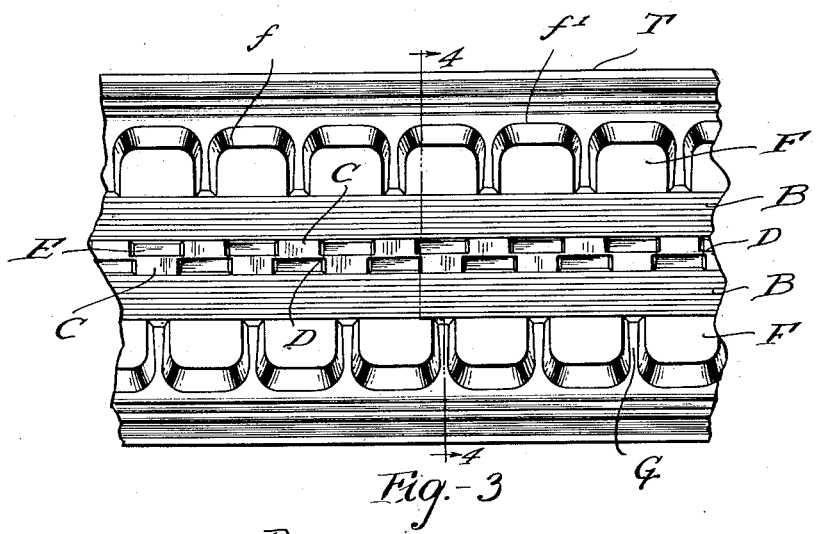
Figure 4:
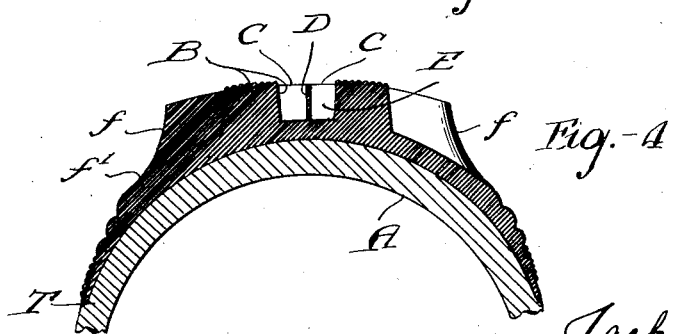

In the drawings, Fig. 1 is a perspective view of a tire having my tire tread; Fig. 2 is a side elevation of a section of the same on an enlarged scale; Fig. 3 is a plan of a section of the tread, and Fig. 4 is a radial cross section of the same.

The tread portion embodying my invention, when formed, consists of a substantial, that is a heavy strip of rubber curved around the outer portion of the tire and vulcanized to the carcass in the usual manner. This strip in effect includes a base designated A from which rise the projections forming the tread itself. Two annular tread strips or ribs, continuous about the entire circumference, are designated B. These are, of course, integral with the base portion A and are about the cross sectional size of the usual central strip of well known types of "non-skid" treads. I find that the best results have been obtained by making the vertical height of the rib at least twice the thickness of the base. Instead of the single strip at the center of the tread, however, these two strips leave in effect a groove between them, whereby the inside edge of each strip is always presented to the road surface and may act effectively in the manner of the ring-like ribs of the usual "rib" tread. To prevent these ribs from turning too readily which is the difficulty found with the usual rib treads, I propose to so brace them with rubber that they are strengthened against turning laterally more than just sufficient to be effective to prevent side skidding, and I have so used the rubber by which I accomplish this bracing as to form the most effective supporting surface. Wherefore, I provide a maximum amount of wearing surface commensurate with the amount of rubber used.

To this end I provide between the two ribs B and B, projections C, extending from each rib B inwardly to the central plane of the tire and of such length with relation to the spaces separating them that they may be offset and are preferably connected by a slight fin or web indicated at D, as is formed between the two parts of the mold in which the tire is shaped and vulcanized.

The greater portion of the space between the tread ribs B and B, is in the nature of a series of cavities E extending from the base portion outwardly whereby these cavities have a depth corresponding to the height of the ribs B. In other words, they define the height of the ribs on the inside.

The outer sides of the ribs B and B are braced by rubber so arranged as to afford a tread and to afford traction. To accomplish this I prefer to form the rubber into a series of blocks, rising from the base with which they are integral, substantially to the height of the ribs B, and curving each way less than the curvature of the carcass, whereby I form what is known as the improved flat tread. These blocks F are preferably nearly rectangular, as shown, and are made at least as wide at their bases as the ribs and somewhat longer circumferentially. Their outer surfaces are slightly reentrant as shown at $f$, and are sloped outwardly to meet the base at $f^1$. These blocks F are separated a distance of considerably less than half their width, preferably about one fourth of the width of the blocks themselves, by cavities which extend to substantially sharp corners meeting the ribs B and the base as shown. These cavities are designated G.

The outer faces of the blocks have a slight curve. They form, in effect, bracing blocks between the base and sides of the tire and rise to the outer faces of ribs B. By making the cavities G defining these blocks of a depth as great or greater than the cavities E, which are unusually deep, the traction and non-skid effect of the blocks is maintained over a comparatively greater period of wear, because the entire tread must be worn well down to the base portion before the sharp edges defining the configurations and elements of the tread, as described, become obscured.

By making the faces of the blocks rise nearly even at their outer edges nearly to the height of the ribs B, and curving them away from the ribs, only slightly so that when there is a normal pressure in the tire to carry the normal load, the entire face of the tread, as formed, is utilized and I am able to secure a great breadth of contact with the roadway. Furthermore, this tread presents thereto several edges from which the receding surfaces, namely those defining the cavities, rise at substantially right angles, whereby the greatest traction and non-skid effect is obtained.

The entire width of the tread S, that is from the outer corner of one block F to the outer corner of either opposite block F, is somewhat less than the usual round tread, whereby I am enabled to form the same amount of rubber at a greater height from the carcass, and also utilizing the entire breadth of the tread, as desired, I obtain a greater wearing life.

Another point of advantage gained by this construction has been demonstrated by experience, namely, that the recesses between the two substantial load supporting tread ribs B form oblong vacuum cups but which are not noisy in running over pavements as is a well known objectionable characteristic of the customary vacuum cup construction arrangement for tire treads.

In use this construction results in excellent traction, because I have a maximum number of transverse lines defined by the sharp edges of the elements going to make up the tread, these transverse traction edges corresponding to it at one instant to the forward edge of the blocks F, C and F, of which there may be several in contact with the road surface. Upon application of the brakes the corresponding opposite edges are equally effected.

It will be seen that by this invention I have provided a maximum number of these edges without sacrificing the large proportion of wearing surface, and without making any one element contacting with the roadway so small that it is likely to be torn off or quickly worn away.

I have also accomplished a very effective construction for preventing of the slide slipping or skidding in a maximum number of circumferential lines, by the arrangement of the two separated tread ribs B and the outer edges of the blocks F, as well as the edges presented substantially along the medial plane by the arrangement of the blocks in the cavities C and E.

Configurations of almost every conceivable form, usually provide for a substantially continuous contact with the roadway surface. I find it desirable to provide even and continuous contact and the arrangement of the ribs B and B associated with the other elements just described, has proven very effective for the purposes named and particularly in assuring great length of life of the tire before the tread is worn away so that it is no longer effective for traction and non-skiding purposes.

It will also be noted that the appearance of the arangement described is very pleasing and in fact, it is one of the objects of the invention to accomplish the purposes of the mechanical characteristics, and at the same time produce the artistic design illustrated. I have found that in using the identical amount of rubber previously used on a more usual form of non-skid tread, I am enabled to greatly increase the mileage for the tire before the projections are obscured.

Having thus described my invention, I claim:

1. A tire tread construction, consisting of a heavy rubber base extending over a substantial width of the tire at its circumference, two parallel complete circumferential ribs rising therefrom and forming the tread strips, blocks adding to the tread surface and serving to brace these tread strips against side strain in both directions, consisting of raised portions of rubber of substantially the height of the ribs and integral with the ribs and base at the outer side of each rib, and projections between the ribs offset to form a series of offset cavities, substantially the length of said last named projections.

2. A tire tread construction, consisting of a heavy rubber base extending over a substantial width of the tire over its circumference, two parallel complete circumferential ribs rising therefrom and forming the tread strips, blocks adding to the tread surface and serving to brace these tread strips against side strain in both directions, consisting of raised portions of rubber of substantially the height of the ribs and integral with the ribs and base, the transverse curve defining the boundary of the blocks and ribs being considerably greater than that of the tire casing adjacent the base, whereby a substantially flat tread is formed.

3. A tire tread construction, consisting of a base portion adapted to be secured to the carcass and having substantial thickness, two parallel completely circumferential tread ribs of substantial width rising from the base portion for a distance of at least twice the thickness of the base portion and bracing blocks resisting side strain on these tread ribs rising substantially to the height of the ribs, and presenting substantially rectangular surfaces at least as wide as the ribs transversely and circumferentially and bracing blocks at the insides of the ribs.

4. A tire tread construction, consisting of a heavy rubber base extending over a substantial width of the tire over its circumference, two parallel complete circumferential ribs rising therefrom and forming the tread strips, blocks adding to the tread surface and serving to brace these tread strips against side strain in both directions, consisting of raised portions of rubber substantially the height of the ribs integral with the ribs and base and on both sides of the ribs, the blocks between the ribs being offset from each other and being connected by a thin web of rubber.

5. A tire tread construction consisting of parallel circumferential ribs, separated a distance corresponding or slightly greater than the thickness of the ribs and rising to a height nearly as great as the width of the ribs, and bracing blocks curving slightly toward the axis of the tire but forming a substantially flat surface and extending from the outer side of each rib and terminating in a sharp edge defined by a surface meeting the base of the tread, whereby there is a continuous series of slightly separated blocks of rubber integral with the ribs and tire itself, preventing lateral tipping of these ribs in either direction, and presenting edges tending to prevent side slipping as well as affording traction and braking action.

6. A tire tread construction consisting of parallel circumferential ribs, separated at either side of the medial plane of the tire and rising to a height nearly as great as the width of the ribs, and bracing blocks curving slightly toward the axis of the tire but forming a substantially flat surface even with the ribs, and extending from the outer side of each rib and all terminating in sharp edges and preventing lateral tipping of these ribs as well as affording traction and braking action.

7. A tire tread construction consisting of parallel circumferential ribs, separated a distance corresponding to or slightly greater than the thickness of the ribs and rising to a height nearly as great as the width of the ribs, and bracing blocks curving slightly toward the axis of the tire but forming a substantially flat surface extending from the outer side of each rib and terminating in a sharp edge defined by a surface meeting the base of the tread, whereby there is a continuous series of slightly separated blocks of rubber integral with the rib and tire itself, preventing lateral tipping of these ribs, and blocks providing cross surfaces or edges between the ribs integral with the ribs and affording a suction or vacuum cup action.

8. An automobile tire tread consisting of a pair of continuous circumferential ribs having their height and width substantially the same, a base portion integral therewith, a thin web of rubber rising from the base substantially the same height as the ribs, diagonally offset blocks of rubber integral with the web, base and ribs, said blocks being separated diagonally a very slight distance.

In testimony whereof, I hereunto affix my signature.

JACKSON D. COMSTOCK.